(12) United States Patent
Ono et al.

(10) Patent No.: US 11,888,281 B2
(45) Date of Patent: Jan. 30, 2024

(54) MULTIMODE OPTICAL AMPLIFIER

(71) Applicant: Nippon Telegraph and Telephone Corporation, Tokyo (JP)

(72) Inventors: Hirotaka Ono, Musashino (JP); Takayuki Mizuno, Musashino (JP); Koki Shibahara, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 643 days.

(21) Appl. No.: 17/252,443

(22) PCT Filed: Jul. 12, 2019

(86) PCT No.: PCT/JP2019/027672
§ 371 (c)(1),
(2) Date: Dec. 15, 2020

(87) PCT Pub. No.: WO2020/017446
PCT Pub. Date: Jan. 23, 2020

(65) Prior Publication Data
US 2021/0257802 A1    Aug. 19, 2021

(30) Foreign Application Priority Data
Jul. 19, 2018   (JP) ................................. 2018-136139

(51) Int. Cl.
*H01S 3/067* (2006.01)
*H01S 3/00* (2006.01)
*H01S 3/16* (2006.01)

(52) U.S. Cl.
CPC ........ *H01S 3/06716* (2013.01); *H01S 3/0078* (2013.01); *H01S 3/1608* (2013.01)

(58) Field of Classification Search
CPC ................ H01S 3/0078; H01S 3/0804; H01S 3/094003; H01S 3/094069; H01S 3/10023; H01S 3/06754-06787; H01S 2301/04
See application file for complete search history.

(56) References Cited

U.S. PATENT DOCUMENTS

2017/0294756 A1* 10/2017 Qiao .................... H01S 3/08095
2019/0245317 A1*  8/2019 Wada ........................ H01S 3/10

OTHER PUBLICATIONS

K. Mizuno et el. ("Development of Etalon-Type Gain-Flattening Filter") Furukawa Review, No. 19. 2000, pp. 53-58 (Year: 2000).*

(Continued)

*Primary Examiner* — Xinning(Tom) Niu
*Assistant Examiner* — Delma R Fordé
(74) *Attorney, Agent, or Firm* — Workman Nydegger (57) ABSTRACT

There is provided a multimode optical amplifier that provides gain to a plurality of propagation modes of signal light. The multimode optical amplifier includes a multiplexer that multiplexes the signal light and excitation light; an amplifying fiber which has a core that propagates a predetermined plurality of propagation modes of the signal light and a predetermined plurality of propagation modes of the excitation light, and which provides an individual gain value for each of the predetermined propagation modes of the signal light; a wavelength-flattening filter that maintains a constant gain value for a frequency for all predetermined propagation modes of the signal light; and a mode-flattening filter that maintains the gain value at a constant value for a predetermined propagation mode of the signal light for all predetermined propagation modes of the signal light.

10 Claims, 6 Drawing Sheets

(56) References Cited

OTHER PUBLICATIONS

Kohki Shibahara, et al., Dense SDM (12-Core × 3-Mode) Transmission Over 527 km with 33.2-ns Mode-Dispersion Employing Low-Complexity Parallel MIMO Frequency-Domain Equalization, Journal of Lightwave Technology, vol. 34, No. 1, Jan. 1, 2016, pp. 196-204.

M. Wada et al., Core-Pumped 10-mode EDFA with Cascaded EDF Configuration, $42^{nd}$ European Conference and Exhibition on Optical Communication, Sep. 18, 2016, pp. 97-99.

Kazutsune Mizuno et al., Development of Etalon Type Optical Gain Equalizer, Furukawa Electric Time Signal, No. 105, 2000, pp. 36-41.

\* cited by examiner

MULTIMODE OPTICAL AMPLIFIER

TECHNICAL FIELD

The present invention relates to a multimode optical amplifier, and more particularly to a multimode optical amplifier that reduces a gain difference between propagation modes of signal light.

BACKGROUND ART

The increase in speed and capacity of communication services has led to an explosive increase in traffic of trunk optical transmission systems. Therefore, a technique for dramatically increasing the transmission capacity of the optical transmission system has been studied. Recent years have seen a rapid development of mode division-multiplexing (MDM) optical transmission technology among various transmission methods. To achieve a long-haul MDM optical transmission system, an optical relay MDM optical transmission is required which uses a multimode optical amplifier that amplifies a plurality of light signals each having a different mode with use of a single amplifying fiber (Non-Patent Literature 1).

CITATION LIST

Non-Patent Literature

Non-Patent Literature 1: K. Shibahara et al., "Dense SDM (12-core×3-mode) transmission over 527 km with 33.2-ns mode-dispersion employing low-complexity parallel MIMO frequency-domain equalization," Journal of Lightwave Technology, Jan. 1, 2016, vol. 34, no. 1, p. 196-204

Non-Patent Literature 2: M. Wada et al., "Core-pumped 10-mode EDFA with cascaded EDF configuration", in Proc. 42nd European Conference and Exhibition on Optical Communications, VDE VERLAG GMBH, Sep. 18-22, 2016, p. 97-99

Non-Patent Literature 3: Mizuno et al., "Development of Etalon-type Gain Flattening Filter", Furukawa Electric Bulletin, 2000, No. 105, p. 36-41

SUMMARY OF THE INVENTION

Technical Problem

Signal light, in a different propagation mode, has a respective different electric field intensity distributions in the cross section of the optical fiber. Thus, signal light, in a different propagation mode, has a respective different overlap state between the distribution of rare earth ions such as erbium added to the core of an optical fiber and the electric field intensity distribution of the signal light. This results in a gain difference (inter-mode gain deviation) between different propagation modes of the signal light (for example, see Non-Patent Literature 2).

The inter-mode gain deviation causes an optical power difference between the propagation modes at a receiving end during long-haul multimode division multiplexing optical transmission relayed through a plurality of multimode optical amplifiers. The transmission distance of an optical signal is limited by the presence of signal light of a propagation mode having a small optical power, that is, a low signal-to-noise ratio. Therefore, the multimode optical amplifier is required to reduce the inter-mode gain deviation as much as possible. For example, Non-Patent Literature 2 discloses a multimode optical amplifier which is constructed by combining different kinds of amplifying multimode fibers and can reduce the inter-mode gain deviation.

However, the multimode optical amplifier constructed using a plurality of kinds of amplifying multimode fibers has great disadvantages in increasing the manufacturing cost of the multimode optical amplifier, complicating its configuration, and the like. Therefore, even the multimode optical amplifier is desired to reduce the inter-mode gain deviation using a filter, such as that for gain-flattening in a conventional single-mode optical amplifier (Non-Patent Literature 3).

Means for Solving the Problem

The present invention has been made to solve the above problem, and an object of the present invention is to provide a multimode optical amplifier capable of reducing a gain difference between propagation modes of signal light.

An embodiment of the present invention is a multimode optical amplifier that provides gain to a plurality of propagation modes of signal light, the multimode optical amplifier comprising: a multiplexer that multiplexes the signal light and excitation light; an amplifying fiber which has a core that propagates a predetermined plurality of propagation modes of the signal light and a predetermined plurality of propagation modes of the excitation light, and which provides an individual gain value for each of the predetermined propagation modes of the signal light; a wavelength-flattening filter that maintains a constant gain value for a frequency for all predetermined propagation modes of the signal light; and a mode-flattening filter that maintains the gain value at a constant value for a predetermined propagation mode of the signal light for all predetermined propagation modes of the signal light.

Effects of the Invention

The multimode optical amplifier according to the present invention has an advantage capable of flattening the gain for a plurality of modes of signal light regardless of a frequency and its propagation mode by using a filter in the same manner as the conventional single-mode optical amplifier.

DESCRIPTION OF EMBODIMENTS

Hereinafter, an embodiment of the present invention will be described in detail. It should be noted that the embodiment of the present invention is not limited to the following examples without departing from the spirit and scope of the present invention.

Embodiment

Figure 1:
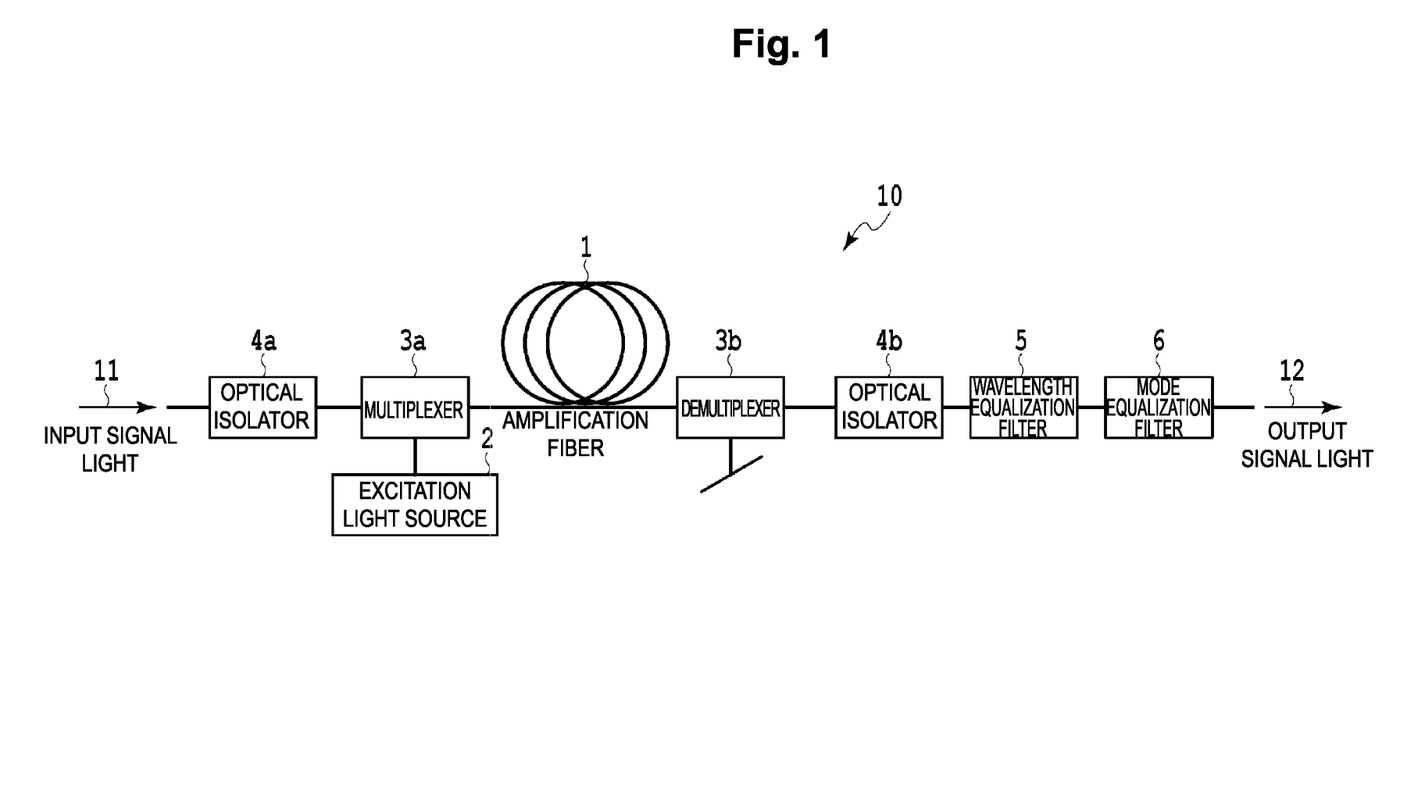
FIG. 1 is block diagram illustrating a configuration of a multimode optical amplifier according to an embodiment of the present invention.

FIG. 1 is block diagram illustrating a configuration of a multimode optical amplifier 10 according to an embodiment of the present invention. The multimode optical amplifier 10 according to an embodiment of the present invention is configured to include: an amplifying fiber 1, an excitation light source 2, a multiplexer 3a that multiplexes signal light and excitation light, a demultiplexer 3b that demultiplexes the signal light and the excitation light, an optical isolator 4a, an optical isolator 4b, a wavelength-flattening filter 5, and a mode-flattening filter 6. Among these components, the components connected in the block diagram of FIG. 1 are optically connected so that light including the signal light can pass and travel.

Assuming that a direction from the optical isolator 4a to the mode-flattening filter 6 is referred to as a forward direction, the multimode optical amplifier 10 inputs the input signal light 11 to the optical isolator 4a, and finally outputs the output signal light 12 from the mode-flattening filter 6.

First, the input signal light 11 is inputted to the optical isolator 4a, which then outputs the signal light in the forward direction. The multiplexer 3a receives the signal light and light (hereinafter referred to as excitation light) from the excitation light source 2, and outputs the multiplexed light. The amplifying fiber 1 receives light obtained by multiplexing the signal light and the excitation light, and the multiplexed light passes through the core of the amplifying fiber 1 and then is outputted. The light outputted from the amplifying fiber 1, including the signal light and the excitation light, is inputted to the demultiplexer 3b. The demultiplexer 3b demultiplexes the signal light and the excitation light. The signal light demultiplexed by the demultiplexer 3b is inputted to the optical isolator 4b, travels in the forward direction, and is outputted from the optical isolator 4b. The signal light outputted from the optical isolator 4b is inputted to the wavelength-flattening filter 5, and is wavelength-flattened, and then is outputted therefrom. The signal light wavelength-flattened by the wavelength-flattening filter 5 and outputted therefrom is inputted to the mode-flattening filter 6 and is mode-flattened. The mode-flattened light is outputted as the output signal light 12.

In the present embodiment, the amplifying fiber 1 is a multimode optical fiber doped with erbium at a light emitting center in its core. The core has a radius of 7 μm and the difference in relative refractive index between the core and the cladding is 1%. The core of the amplifying fiber 1 can propagate a plurality of modes. When the wavelength band of the input signal light is 1550 nm band, the mode propagating in the core of the amplifying fiber 1 includes six propagation modes: $LP_{01}$, $LP_{11}$, $LP_{21}$, $LP_{02}$, $LP_{31}$, and $LP_{12}$. When distinguishing is made, for each mode having an odd and even modes, between those modes, there are obtained ten propagation modes: $LP_{01}$, $LP_{11o}$, $LP_{11e}$, $LP_{21o}$, $LP_{21e}$, $LP_{02}$, $LP_{31o}$, $LP_{31e}$, $LP_{12o}$, and $LP_{12e}$. In other words, the signal light in the wavelength 1550 nm band propagating in the core of the amplifying fiber 1 has six propagation mode (ten propagation modes when the even mode and the odd mode are distinguished) (hereinafter referred to as 6-LP modes and 10 modes respectively).

The excitation light source 2 is a semiconductor laser having a wavelength 980 nm band. Light is generated in a fundamental mode ($LP_{01}$ mode).

The multiplexer 3a includes a dichroic mirror which reflects light having a wavelength 980 nm band and transmits light having a wavelength 1550 nm band, and a phase plate. The phase plate receives excitation light having the wavelength 980 nm band from the excitation light source 2 and converts the excitation light from the $LP_{01}$ mode to the $LP_{02}$ mode. Then, the excitation light having the wavelength 980 nm band converted to the $LP_{02}$ mode is multiplexed with the signal light having the wavelength 1550 nm band through the dichroic mirror, is outputted from the multiplexer 3a, and then is inputted to the amplifying fiber 1.

Figure 2:
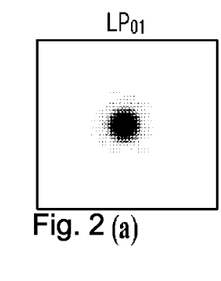
FIG. 2 is an optical power distribution diagram of modes of signal light amplified by the multimode optical amplifier according to the embodiment of the present invention. FIGS. (a) to (j) correspond to the respective modes of $LP_{01}$, $LP_{11o}$, $LP_{11e}$, $LP_{21o}$, $LP_{21e}$, $LP_{02}$, $LP_{31o}$, $LP_{31e}$, $LP_{12o}$, and $LP_{12e}$.
Figure 2D:
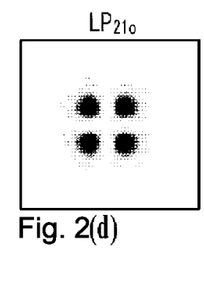
Figure 2F:
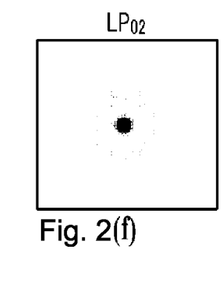
Figure 2H:
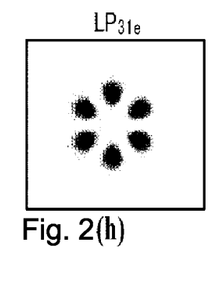
Figure 2I:
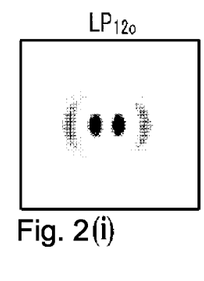

FIG. 2 is an optical power distribution diagram for each mode of the 6-LP modes (10 modes) of signal light having the wavelength band 1550 nm propagating in the core of the amplifying fiber 1. FIG. 2 indicates that the darker the black color, the greater the optical power, and the optical power decreases as the color becomes lighter from black to white (or the color of the paper). Each of (a) to (j) in FIG. 2 illustrates an optical power distribution diagram of the ten propagation modes propagating inside the core of the amplifying fiber 1 respectively. Each of (a) to (j) in FIG. 2 corresponds to each mode of $LP_{01}$, $LP_{11o}$, $LP_{11e}$, $LP_{21o}$, $LP_{21e}$, $LP_{02}$, $LP_{31o}$, $LP_{31e}$, $LP_{12o}$, and $LP_{12e}$ respectively. As used herein, numerals and characters in the subscripts of LP indicate the modes of the propagation mode, such that o indicates the odd mode, and e indicates the even mode.

Figure 3:
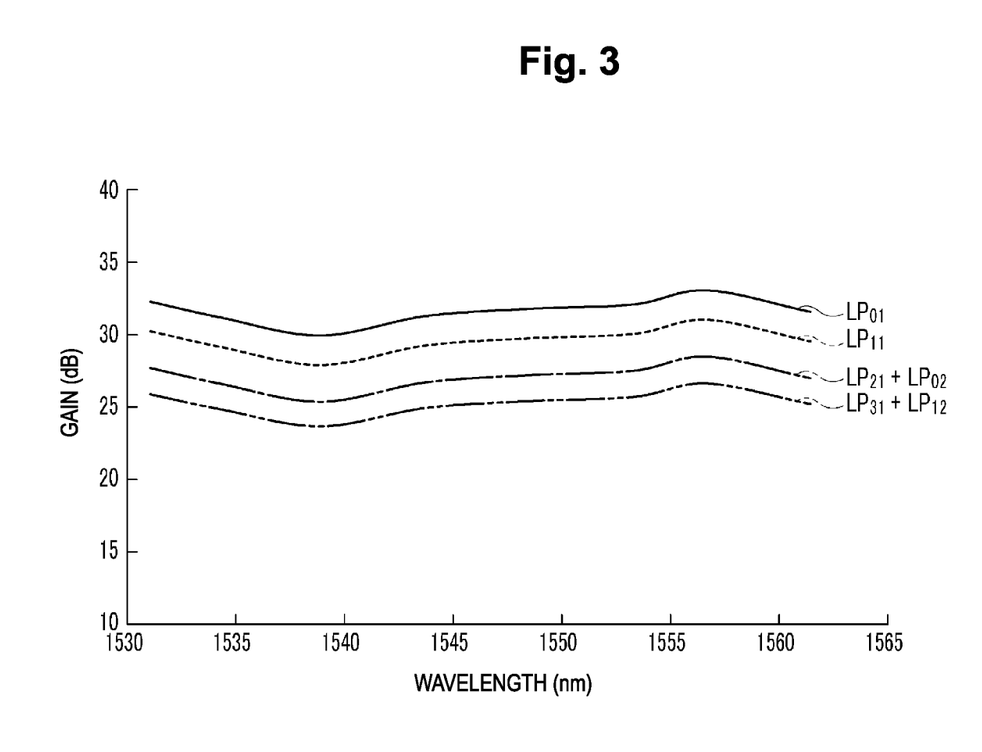
FIG. 3 is a graph illustrating gain spectra by an amplifying fiber constituting the multimode optical amplifier according to the embodiment of the present invention.

FIG. 3 illustrates gain spectra by the amplifying fiber 1 constituting the multimode optical amplifier 10. The horizontal axis indicates wavelengths, which are bands near a wavelength band 1550 nm of signal light. The vertical axis indicates a gain obtained for each wavelength. The gain spectra indicate four propagation modes, in which the $LP_{01}$ mode is represented by a solid line, $LP_{11}$ mode is represented by a chain line, $LP_{21}+LP_{02}$ mode is represented by a one-dot chain line, and the $LP_{31}+LP_{12}$ mode is represented by a two-dot chain line.

Here, degeneracy of the propagation mode and conversion of the propagation mode will be described. Here, the $LP_{11o}$ mode and the $LP_{11e}$ mode, the $LP_{21o}$ mode and the $LP_{21e}$ mode, the $LP_{31o}$ mode and the $LP_{31e}$ mode, and the $LP_{12o}$ mode and the $LP_{12e}$ mode are subjected to mode conversion during propagation in the 6-LP modes, causing the odd $mode_o$ and even $mode_e$ thereof to be degenerated, hence resulting in the respective degenerate modes: $LP_{11}$, $LP_{21}$, $LP_{31}$, and $LP_{12}$. Further, the $LP_{21}$ and the $LP_{02}$ modes have very close propagation constant values, and the $LP_{31}$ and the $LP_{12}$ modes also have very close propagation constant values, and thus the $LP_{21}$ and the $LP_{02}$ modes, and the $LP_{31}$ and the $LP_{12}$ modes are subjected to frequent mode conversion during propagation inside the core of the amplifying fiber 1. As a result, it is impossible to distinguish between the two modes, namely, between the $LP_{21}$ and $LP_{02}$ modes and between the $LP_{31}$ and $LP_{12}$ modes in terms of optical characteristics. Thus, when the optical characteristics such as filter loss and optical amplifier gain are evaluated, the two modes are treated as one propagation mode such as $LP_{21}+LP_{02}$ and $LP_{31}+LP_{12}$ respectively.

It can be understood from FIG. 3 that the minimum gain values in the gain spectra of each mode of signal light are different depending on the propagation modes such as 29.9 dB in $LP_{01}$ mode, 27.9 dB in $LP_{11}$ mode, 25.4 dB in $LP_{21}+LP_{02}$ mode, and 23.6 dB in the $LP_{31}+LP_{12}$ mode. Further, each propagation mode has substantially the same gain wavelength dependency and similar gain spectrum shapes. This is because before being inputted to the amplifying fiber 1, the excitation light in the wavelength 980 nm band is converted to the $LP_{02}$ mode by the phase plate provided in the multiplexer 3a. The $LP_{02}$ mode of excitation light inputted to the amplifying fiber 1 is converted to the $LP_{21o}$ mode and the $LP_{21e}$ mode having very close propagation constants while propagating in the core of the amplifying fiber 1, and further the $LP_{21o}$ mode and the $LP_{21e}$ mode are converted to the $LP_{02}$ mode, so that mutual mode conversion frequently occurs. Therefore, the inside of the amplifying fiber 1 is excited by a mixed mode including three propagation modes of the excitation light, namely, the $LP_{02}$ mode, the $LP_{21o}$ mode, and the $LP_{21e}$ mode. As illustrated in FIG. 2, when the optical power distributions of those propagation modes are considered, the distribution of the excited erbium can be made more uniform among the erbium added to and uniformly distributed in the core of the amplifying fiber 1. Meanwhile, an increase in the order of the propagation mode of the signal light causes the optical power in the core to be distributed in an area away from the center of the core. Thus, the higher the order of propagation mode of light, the smaller the overlap with the excited erbium. Therefore, each propagation mode has a similar gain spectrum shape, but the gain value decreases as the order of the propagation mode increases.

Figure 4:
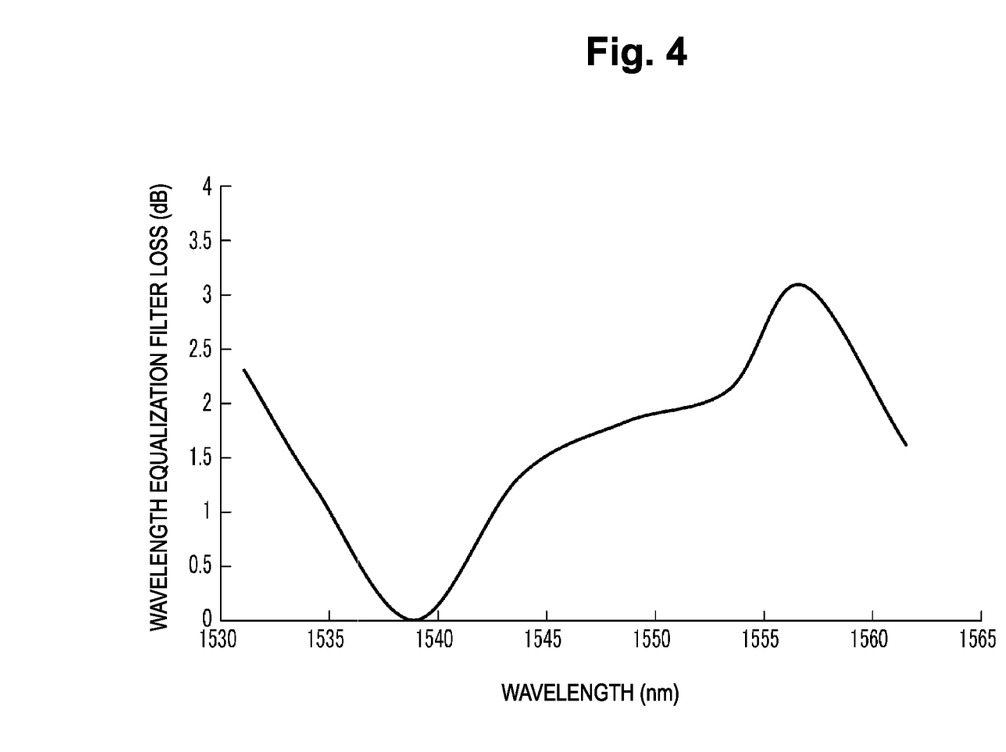
FIG. 4 is a graph illustrating loss spectra of a wavelength-flattening filter constituting the multimode optical amplifier according to the embodiment of the present invention.

FIG. 4 is a graph illustrating loss spectra of the wavelength-flattening filter 5 constituting the multimode optical amplifier 10 according to the present embodiment. The horizontal axis indicates wavelengths which are bands near the wavelength band 1550 nm of the signal light. The vertical axis indicates loss values at each wavelength.

The use of similarity of the spectrum shapes in the signal light gain between the propagation modes by the amplifying fiber 1 illustrated in FIG. 3 allows the values of the signal light gain with respect to the wavelength to be flattened regardless of whether the order of the propagation mode is high or low by the following method. Here, the method is to receive the signal light outputted from the amplifying fiber 1 and then pass the signal light through the wavelength-flattening filter 5 having a single loss spectrum shape illustrated in FIG. 4.

The principle of the wavelength-flattening filter 5 will be described in detail. According to the gain spectra illustrated in FIG. 3, the gain value of the signal light by the amplifying fiber 1 has a frequency dependency indicating a minimum value in a wavelength band of 1535 nm to 1540 nm and a maximum value in a wavelength band of 1555 nm to 1560 nm. Further, in a band between the minimum value and the maximum value, the gain value of the signal light by the amplifying fiber 1 tends to monotonically increase. In light of this, the loss value in the wavelength-flattening filter 5 is set so that loss does not occur at the minimum value (loss 0 dB) and the loss value becomes maximum at the maximum value. Further, the loss value by the wavelength-flattening filter 5 is set so that the loss value tends to monotonically increase in the band between the minimum value and the maximum value. In other words, the frequency characteristics of the loss values provided by the wavelength-flattening filter 5, namely, the loss spectra are set corresponding to the shapes of the gain spectra of the signal light by the amplifying fiber 1 illustrated in FIG. 3.

Further, according to the gain spectra illustrated in FIG. 3, the difference between the maximum value and the minimum value of the gain value of the signal light by the amplifying fiber 1 is about 3 dB in a wavelength band of 1530 nm to 1565 nm. Thus, the difference between the maximum value and the minimum value of the loss value in the band by the wavelength-flattening filter 5 is also set to about 3 dB.

Here, as described above, the spectrum shape in the gain of the signal light by the amplifying fiber 1 is similar among the propagation modes. Therefore, the shapes of the loss spectra of the wavelength-flattening filter 5 do not need to be set individually for each mode of the signal light, but only one needs to be set. In other words, the signal light is outputted from the amplifying fiber 1 and then passes through the wavelength-flattening filter 5 having the thus set loss spectra, so that the gain spectra of the signal light by the amplifying fiber 1 are smoothed in the wavelength band of the signal light regardless of whether the order of the propagation mode is high or low.

Figure 5:
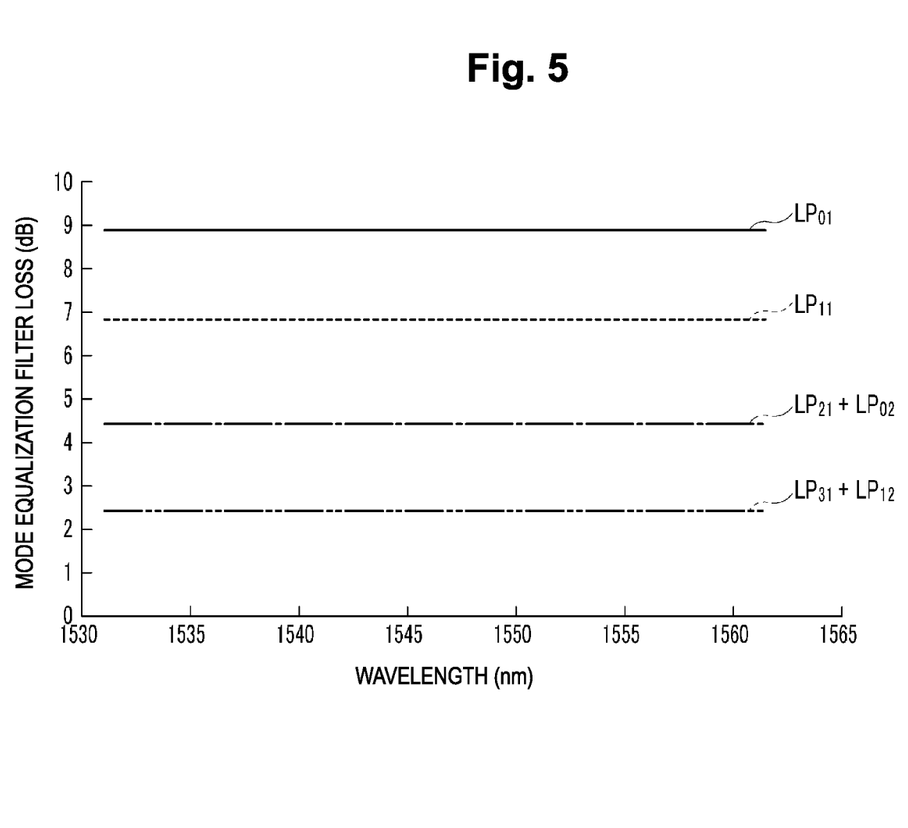
FIG. 5 is a graph illustrating loss spectra of a mode-flattening filter constituting the multimode optical amplifier according to the embodiment of the present invention.

FIG. 5 is a graph illustrating loss spectra of the mode-flattening filter 6 constituting the multimode optical amplifier 10 according to the present embodiment. The horizontal axis indicates wavelengths, which are bands near a wavelength band 1550 nm of signal light. The vertical axis indicates loss values obtained for each wavelength. Four propagation modes are indicated as the loss spectra of the mode-flattening filter 6. Here, the $LP_{01}$ mode is represented by a solid line, the $LP_{11}$ mode is represented by a chain line, the $LP_{21}+LP_{02}$ mode is represented by a one-dot chain line, and the $LP_{31}+LP_{12}$ mode is represented by a two-dot chain line.

In the present embodiment, each propagation mode of the signal light passing through the wavelength-flattening filter 5 and thereby having an equal gain value regardless of the wavelength is outputted from the wavelength-flattening filter 5, and is further inputted to the mode-flattening filter 6, and passes therethrough, whereby the gain values of each propagation mode are flattened regardless of the mode. This mode-flattening filter 6 has an effect of providing an individual loss for each propagation mode of the signal light regardless of the mode. As described above, the gain value of the signal light in the core of the amplifying fiber 1 decreases as the order of the propagation mode increases. Therefore, as illustrated in FIG. 5, the mode-flattening filter 6 is configured to have loss spectra such that the loss of the signal light with respect to the gain of the signal light monotonically decreases as the order of the propagation mode of the signal light increases.

In the present embodiment, a mode-flattening filter configured to include a partial ND filter and a collimator lens is used as the mode-flattening filter 6. Here, the partial ND filter, which is a component of the mode-flattening filter 6, is configured to reduce the optical power with respect to a part of light in a predetermined propagation mode collimated by the collimator lens. More specifically, the partial ND filter is designed to reduce light transmittance with respect to a part of a region through which light passes when the light passes through the partial ND filter.

Further, the mode-flattening filter 6 according to the present embodiment has three sets each consisting of, as a combination, a collimator lens and a partial ND filter. The number of sets can be freely set within a range in which desired mode flattening characteristics can be obtained, and two or more sets are preferable. Meanwhile, if the number of sets is less than two sets, that is, only one set, the mode flattening characteristics are inferior to those of two or more sets, but one set may be used if there is no problem with the use of one set. In other words, the number of ND filter sets depends on the mode flattening characteristics and the use conditions.

Thus, according to the present embodiment, the signal light outputted from the amplifying fiber 1 can be processed such that first the single wavelength-flattening filter 5 flattens the wavelength dependency of gain regardless of whether the order of the propagation mode of the signal light is high or low, and further the subsequent mode-flattening filter 6 flattens the gain value of each propagation mode of the signal light. Specifically, the gain spectra of each propagation mode of the signal light of $LP_{01}$, $LP_{11}$, $LP_{21}+LP_{02}$, and $LP_{31}+LP_{12}$ are substantially constant regardless of the wavelength and the order of the propagation mode, and can be flattened within a range of 21.1 plus/minus 0.1 dB.

In the above embodiment, the propagation mode of the excitation light generated from the excitation light source 2 in the core of the amplifying fiber 1 is set to the $LP_{02}$ mode. Here, even if the propagation mode of the excitation light in the core of the amplifying fiber 1 is set to the $LP_{21}$ mode, mutual mode conversion occurring between the $LP_{21}$ mode and the $LP_{02}$ mode can excite erbium in the core of the amplifying fiber 1 as a mixed mode including the $LP_{02}$ mode, the $LP_{21o}$ mode, and the $LP_{21e}$ mode in the same manner as described above, and the gain spectra can be flattened in the same manner as described above.

When the propagation mode of the excitation light in the core of the amplifying fiber 1 is set to the $LP_{21}$ mode, it is preferable that the $LP_{21o}$ mode and the $LP_{21e}$ mode are inputted to the amplifying fiber 1 with the same optical power in order to eliminate the influence of nonuniformity that occurs during manufacturing and slightly remains in an azimuthal angle direction of the amplifying fiber 1. Further, it is apparent that similar gain spectra can also be flattened using the excitation light obtained by multiplexing the $LP_{02}$ mode, the $LP_{21o}$ mode, and the $LP_{21e}$ mode.

Further, the amplifying fiber 1 used in the present embodiment can also cause the propagation modes of excitation light in the core of the amplifying fiber 1 to propagate as the $LP_{41}$ mode, the $LP_{22}$ mode, and the $LP_{03}$ mode in the core of the amplifying fiber 1. The propagation constants of these modes are very close and mutual mode conversion frequently occurs during propagation in the core of the amplifying fiber 1. This is applied to the propagation modes of the $LP_{21o}$ mode, the $LP_{21e}$ mode, and the $LP_{02}$ mode. Thus, as the propagation modes of the excitation light in the core of the amplifying fiber 1, a mixed mode including one or two or three modes from among the $LP_{41o}$ mode and the $LP_{41e}$ mode, the $LP_{22o}$ mode and the $LP_{22e}$ mode, and the $LP_{03}$ mode can be used to flatten the gain spectra of the signal light in the same manner as described above.

When the mutual mode conversion between the $LP_{mm'}$ mode and the $LP_{0n}$ mode (m, m', and n are integers) is applied to the propagation modes of the excitation light in the core of the amplifying fiber 1, described in the present embodiment, both m and n need to be equal to or greater than 2. When an eigenfunction of a mode in a waveguide is analytically considered, the $LP_{11}$ mode where m is 1 has no $LP_{0n}$ mode whose propagation constants are very close or the $LP_{01}$ mode where n is 1 has no $LP_{mm'}$ mode whose propagation constants are very close. Furthermore, when the propagation mode of the excitation light in the core of the amplifying fiber 1 is the $LP_{02}$ mode, the $LP_{21}$ mode also can always propagate in the core of the amplifying fiber 1, but the opposite is not always true. Thus, the propagation mode of the excitation light in the core of the amplifying fiber 1 needs to be the $LP_{02}$ mode.

Comparative Example

Figure 6:
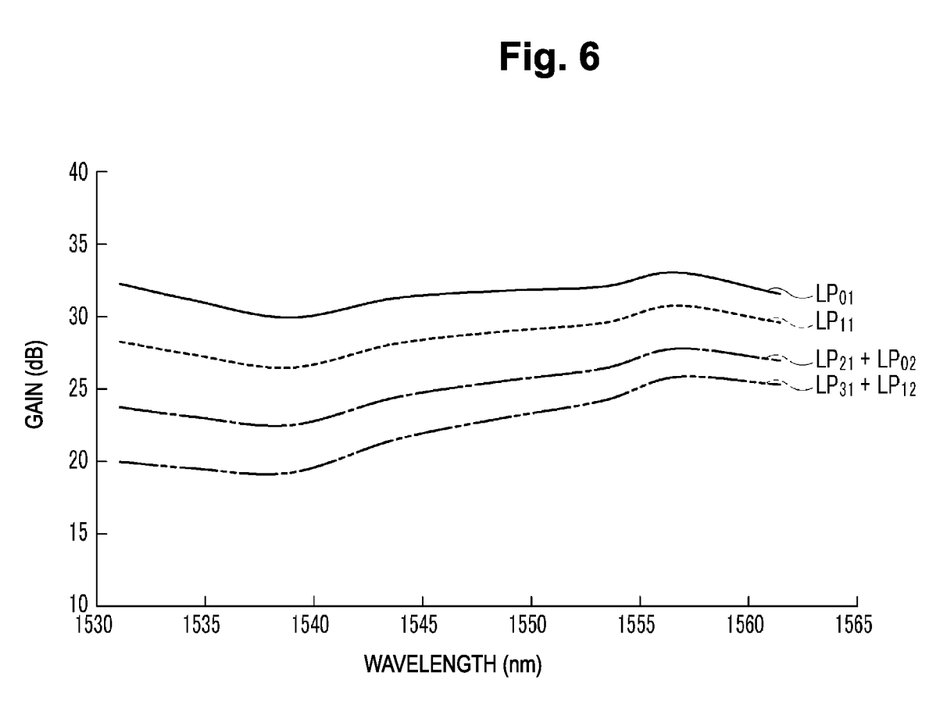
FIG. 6 is a graph illustrating gain spectra of a multimode optical amplifier (comparative example) having configuration different from the multimode optical amplifier according to the present invention.

FIG. 6 is a graph illustrating gain spectra by a multimode optical amplifier having a configuration different from the multimode optical amplifier 10 according to the present invention. The horizontal axis indicates wavelengths, which are bands near a wavelength band 1550 nm of signal light. The vertical axis indicates a gain obtained for each wavelength. The gain spectra indicate four propagation modes, in which the $LP_{01}$ mode is represented by a solid line, the $LP_{11}$ mode is represented by a chain line, the $LP_{21}+LP_{02}$ mode is represented by a one-dot chain line, and the $LP_{31}+LP_{12}$ mode is represented by a two-dot chain line.

The multimode optical amplifier in this case does not include the phase plate in the configuration of the multiplexer 3a of the multimode optical amplifier 10 in the above embodiment and is configured such that the $LP_{01}$ mode is used as the propagation mode of the excitation light in the core of the amplifying fiber 1 generated from the excitation light source 2. When compared with FIG. 3, assuming that the $LP_{01}$ mode is used as the propagation mode of the excitation light in the core of the amplifying fiber 1, the signal light exhibits a remarkable tendency for the increment of gain value to increase from a low-wavelength side to a long-wavelength side as the order of the propagation mode in the core of the amplifying fiber 1 increases.

In other words, it is understood that if the $LP_{01}$ mode is used as the propagation mode of excitation light in the core of the amplifying fiber 1, it is difficult to easily perform the wavelength flattening and the mode flattening of gain spectra as in the above embodiment.

REFERENCE SIGNS LIST 1 amplifying fiber
2 excitation light source
3a multiplexer
3b demultiplexer
4a,4b optical isolator
5 wavelength-flattening filter
6 mode-flattening filter
10 multimode optical amplifier
11 input signal light
12 output signal light

The invention claimed is:

1. A multimode optical amplifier that provides gain to a plurality of propagation modes of signal light, the multimode optical amplifier comprising:
   a multiplexer that multiplexes the signal light and excitation light;
   an amplifying fiber which has a core that propagates a predetermined plurality of propagation modes of the signal light and a predetermined plurality of propagation modes of the excitation light, and which provides an individual gain value for each of the predetermined propagation modes of the signal light;
   a wavelength-flattening filter that maintains a constant gain value for a frequency for all predetermined propagation modes of the signal light; and
   a mode-flattening filter that maintains the gain value at a constant value for a predetermined propagation mode of the signal light for all predetermined propagation modes of the signal light.

2. The multimode optical amplifier according to claim 1, wherein the amplifying fiber is such that
the predetermined plurality of propagation modes of the excitation light is an LP0n mode (n is an integer of 2 or more), an LPmm' mode (m is an integer of 2 or more, and m' is an integer of 1 or more), or a part of a mixed mode in which in which they are mixed;
when the predetermined plurality of propagation modes of the excitation light propagates in the core of the amplifying fiber,
in a cross section of the core of the amplifying fiber, a light emitting center doped with erbium in the core of the amplifying fiber is uniformly excited.

3. The multimode optical amplifier according to claim 2, wherein the predetermined propagation mode of the excitation light becomes the $LP_{0n}$ mode by passing through a phase plate provided in the multiplexer.

4. The multimode optical amplifier according to claim 3, wherein the wavelength-flattening filter:
has a loss spectrum for the frequency corresponding to a gain value for the frequency, and
has a single loss spectrum for the frequency.

5. The multimode optical amplifier according to claim 3, wherein the mode-flattening filter includes a plurality of sets, the set comprising:
a collimator lens, and
a partial ND filter configured to reduce an optical power with respect to a part of the predetermined propagation mode of the signal light collimated by the collimator lens.

6. The multimode optical amplifier according to claim 2, wherein the wavelength-flattening filter:
has a loss spectrum for the frequency corresponding to a gain value for the frequency, and
has a single loss spectrum for the frequency.

7. The multimode optical amplifier according to claim 2, wherein the mode-flattening filter includes a plurality of sets, the set comprising:
a collimator lens, and
a partial ND filter configured to reduce an optical power with respect to a part of the predetermined propagation mode of the signal light collimated by the collimator lens.

8. The multimode optical amplifier according to claim 1, wherein the wavelength-flattening filter:
has a loss spectrum for the frequency corresponding to a gain value for the frequency, and
has a single loss spectrum for the frequency.

9. The multimode optical amplifier according to claim 8, wherein the mode-flattening filter includes a plurality of sets, the set comprising:
a collimator lens, and
a partial ND filter configured to reduce an optical power with respect to a part of the predetermined propagation mode of the signal light collimated by the collimator lens.

10. The multimode optical amplifier according to claim 1, wherein the mode-flattening filter includes a plurality of sets, the set comprising:
a collimator lens, and
a partial ND filter configured to reduce an optical power with respect to a part of the predetermined propagation mode of the signal light collimated by the collimator lens.

* * * * *